United States Patent [19]
Kakizaki et al.

[11] Patent Number: 5,541,809
[45] Date of Patent: Jul. 30, 1996

[54] ELECTRONIC EQUIPMENTS CHASSIS MADE FROM BENT SHEET METAL

[75] Inventors: Masahiko Kakizaki, Tokyo; Takashi Hishinuma; Toshihide Oba, both of Kanagawa, all of Japan

[73] Assignee: Sony Corporation, Tokyo, Japan

[21] Appl. No.: 306,714

[22] Filed: Sep. 15, 1994

[30] Foreign Application Priority Data

Sep. 20, 1993 [JP] Japan .................. 5-233614

[51] Int. Cl.⁶ .................. G06F 1/16; G11B 17/035
[52] U.S. Cl. .................. 361/683; 364/708.1; 361/685; 369/75.2
[58] Field of Search .................. 361/683, 684, 361/685, 724–727, 679, 680, 681; 369/75.1, 75.2, 77.1; 200/5 R, 5 A, 16 R, 16 C; 429/96–100; 364/708.1; G06F 1/16

[56] References Cited

U.S. PATENT DOCUMENTS

| | | | |
|---|---|---|---|
| 3,881,961 | 6/1975 | Nation | 429/97 |
| 4,269,908 | 4/1981 | Stemme | 429/98 |
| 4,386,240 | 5/1983 | Philipp et al. | 200/5 R |
| 4,847,452 | 7/1989 | Inaba | 200/5 A |
| 4,908,793 | 3/1990 | Yamagata et al. | 365/52 |
| 5,206,098 | 4/1993 | Cho et al. | 429/96 |
| 5,265,083 | 11/1993 | Ishii et al. | 369/75.2 |
| 5,270,702 | 12/1993 | Krolak | 429/100 |
| 5,341,357 | 8/1994 | Mukawa et al. | 369/75.2 |
| 5,355,,357 | 10/1994 | Yamamori et al. | 369/75.2 |
| 5,366,185 | 11/1994 | Michael et al. | 361/725 |
| 5,422,447 | 6/1995 | Spence | 200/5 A |

FOREIGN PATENT DOCUMENTS

| | | | |
|---|---|---|---|
| 0128498A1 | 12/1984 | European Pat. Off. | G11B 1/00 |
| 0475595A2 | 3/1992 | European Pat. Off. | G11B 25/04 |
| 0528420A2 | 2/1993 | European Pat. Off. | G11B 17/00 |
| 2250126 | 5/1992 | United Kingdom | G11B 33/12 |

*Primary Examiner*—Gerald P. Tolin
*Assistant Examiner*—Lynn D. Hendrickson
*Attorney, Agent, or Firm*—Limbach & Limbach L.L.P.

[57] ABSTRACT

An electronic equipment, such as a recording and/or reproducing apparatus for recording and/or reproducing an information signal in and/or from a recording medium. The electronic equipment includes a drive mechanism portion, a chassis, an upper lid, a lower lid, a panel frame and a battery compartment portion. The chassis is a frame substantially square in shape and is formed by bending a band-shaped piece of sheet metal. The chassis supports therein the drive mechanism portion through a damping mechanism. The upper lid is made of a metal material and attached to one surface side of the chassis so as to open and close the drive mechanism portion. The lower lid is made of a metal material and attached to the chassis so as to close the other surface of the chassis. The panel frame is substantially U-letter in shape and made of a synthetic resin. The panel frame has a plurality of operation buttons provided thereon and is attached to the outside of the chassis. The battery compartment portion has substantially the same thickness obtained under the condition that the lower lid is attached to the chassis and that the drive mechanism portion is closed by the upper lid. The battery compartment portion is made of a metal material and attached to one side wall of the chassis.

12 Claims, 16 Drawing Sheets

ELECTRONIC EQUIPMENTS CHASSIS MADE FROM BENT SHEET METAL

BACKGROUND

1. Field of the Invention

The present invention relates to electronic equipment and, more particularly to an electronic equipment including a chassis.

2. Background of the Invention

Electronic equipment, such as disc players which are or tape cassette players, small and thin and excellent in portability are now very popular on the market.

To make this portable electronic equipment small and thin, it has been proposed to simplify a drive mechanism portion of the electronic equipment as much as possible. However, there is a limit to such efforts to simplify the drive mechanism portion of the electronic equipment.

Under the above-mentioned situation, to make this portable electronic equipment smaller and thinner, it has been proposed that the structure of a chassis on which the drive mechanism portion is supported be simplified.

However, if the chassis is simplified in structure, then the chassis low strength cannot possible to provide electronic equipments that can be used satisfactorily in actual practice.

SUMMARY OF THE INVENTION

It is, therefore, an object of the present invention to provide an electronic equipment in which the above-mentioned problems can be solved.

According to the present invention, there is provided an electronic equipment which includes a drive mechanism portion, a chassis and a battery compartment portion. The chassis is substantially square in shape and formed by bending a sheet metal in a frame-shaped fashion. The chassis supports the drive mechanism portion thereon. The battery compartment portion is made of a rigid material and attached to the chassis in alignment with one side wall of the chassis.

According to the present invention, there is provided an electronic equipment which includes a chassis, an upper lid, a lower lid, a panel frame of substantially U-letter configuration and a battery compartment portion. The chassis is made as a frame substantially square in shape by bending band-shaped sheet metal. The chassis supports therein a drive mechanism portion through a damping mechanism. The upper lid is attached to one surface side of the chassis to allow opening and closing of the drive mechanism portion. The upper lid is made of a metal material. The lower lid is attached to the chassis so as to close the other surface of the chassis and made of a metal material. The panel frame has a plurality of operation buttons disposed thereon and is attached to the outside of the chassis. The panel frame is made of a synthetic resin. The battery compartment portion has substantially the same thickness obtained under the condition that the lower lid is attached to the chassis and that the drive mechanism portion is closed by the upper lid. The battery compartment portion is made of a metal material and is attached to a side surface of the chassis.

According to the present invention, since the chassis is made by bending the sheet metal into the shape of a frame, even when the chassis structure is simplified, it is possible to increase rigidity of the chassis by attaching the battery compartment portion to the chassis as a rigid member.

Furthermore, according to the electronic equipment of the present invention, since the chassis which supports thereon the drive mechanism portion is simplified in structure, the electronic equipment can be miniaturized and made much more thin.

DESCRIPTION OF THE INVENTION

An electronic equipment according to an embodiment of the present invention will hereinafter be described with reference to the drawings. In the following embodiment, the present invention is applied to a disc player.

Figure 1:
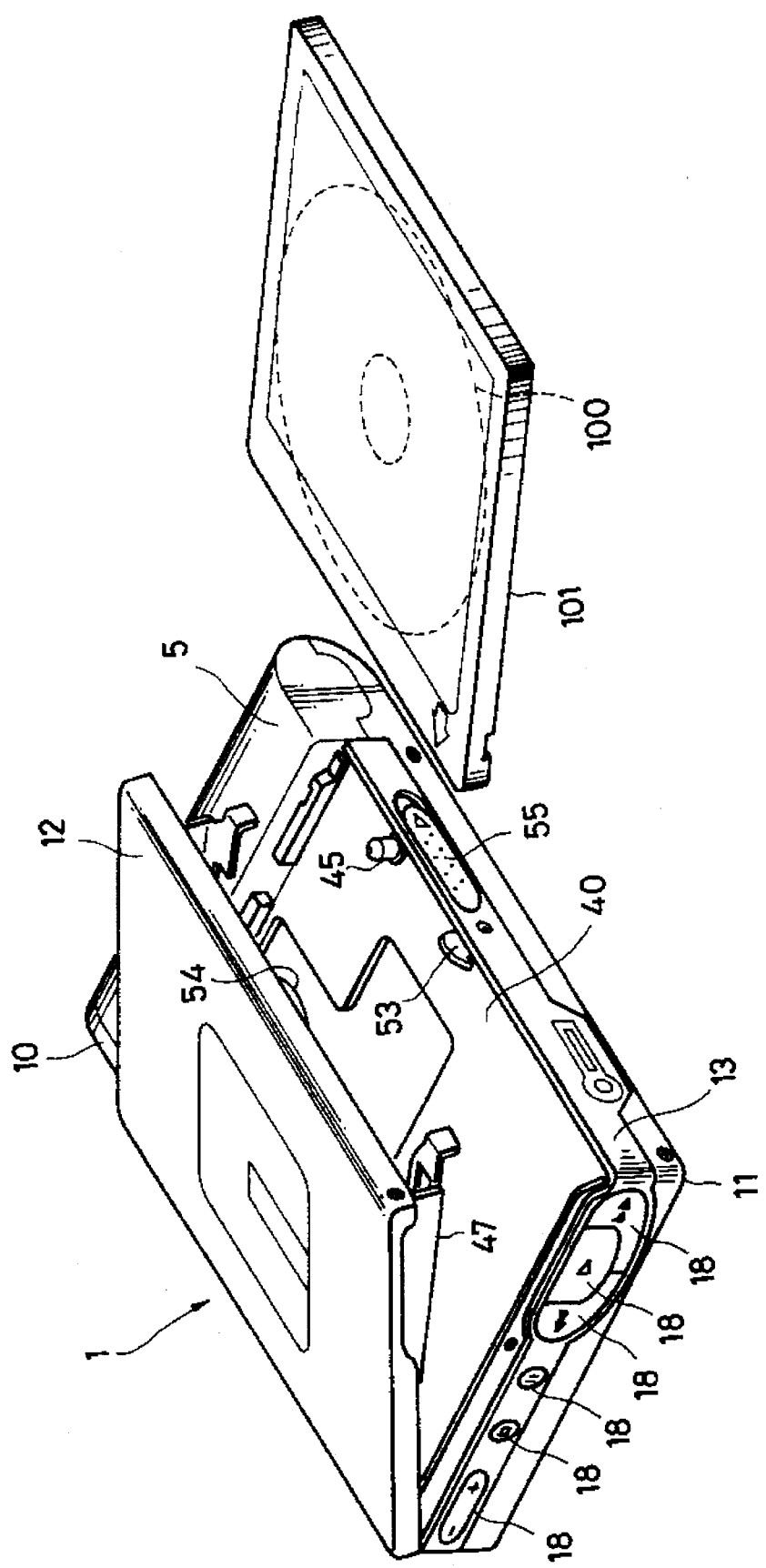
FIG. 1 is a perspective view of a disc player according to an embodiment of the present invention.

FIG. 1 is a perspective view showing an outer face of a disc player 1 to which the embodiment of the present invention is applied. As shown in FIG. 1, a magneto-optical disc, i.e., an optical disc 100 (hereinafter simply referred to as a disc) that is loaded on the disc player 1 is accommodated within a cartridge (hereinafter referred to as a disc cartridge) 101 made of a plastic material. The disc 100 is rotatable within the cartridge 101. A signal, i.e., signal representing a piece of music or the like is already recorded on the disc 100. The disc cartridge 101, in which the disc 100 is accommodated is loaded onto the disc player 1 and there after the disc 100 to can be reproduced.

The disc player 1 is made smaller and thinner as compared with the conventional disc players of the same kind because its disc player 1 is designed with a great stress on the portability. The disc player 1 is of a ultra-thin type disc player and has a thickness of 18.5 mm.

The structure that can make the disc player 1 become small and thin will be described with reference to FIGS. 2 to 4.

Figure 2:
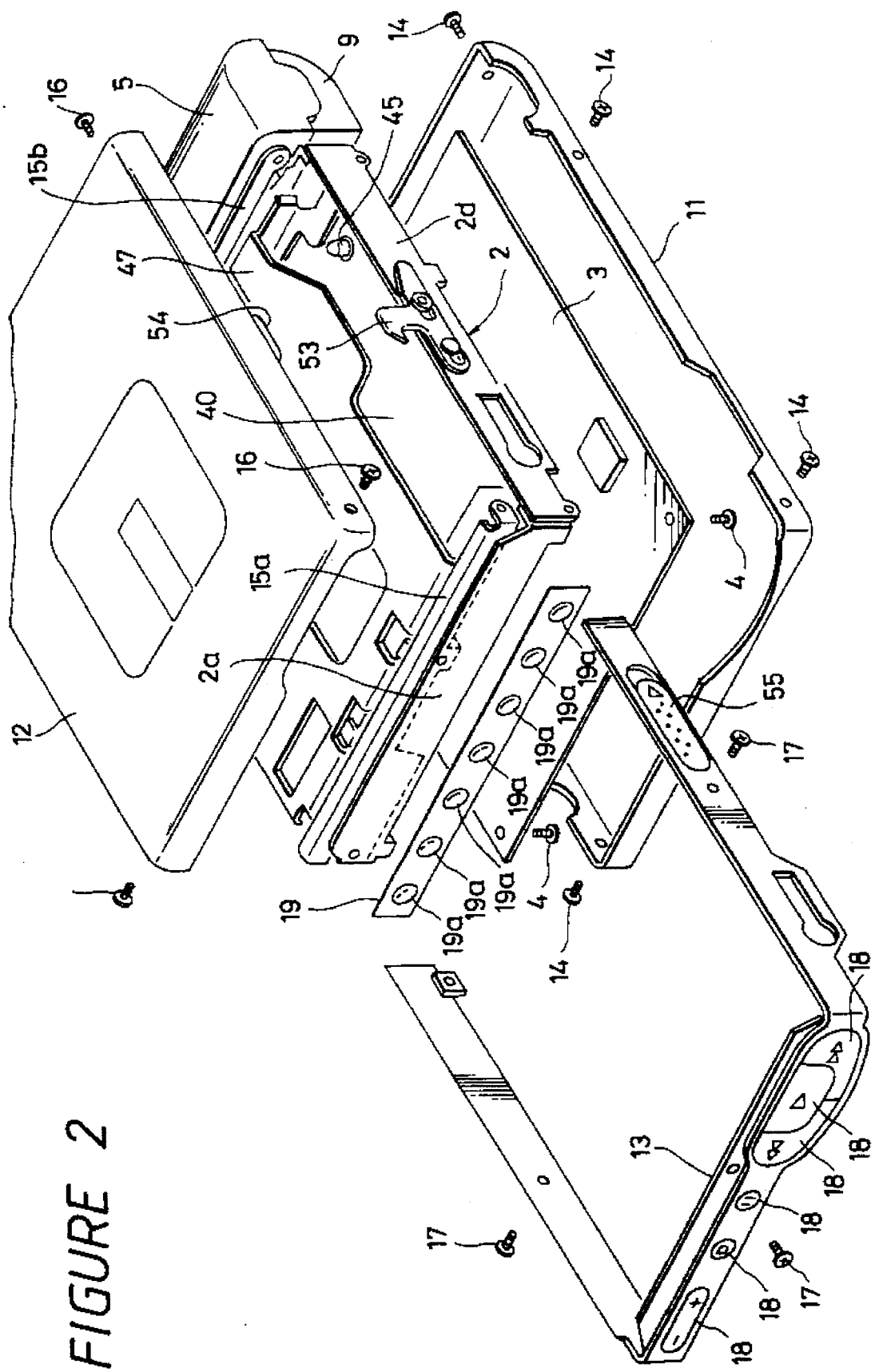
FIG. 2 is an exploded perspective view of the disc player according to the embodiment of the present invention.
Figure 3:
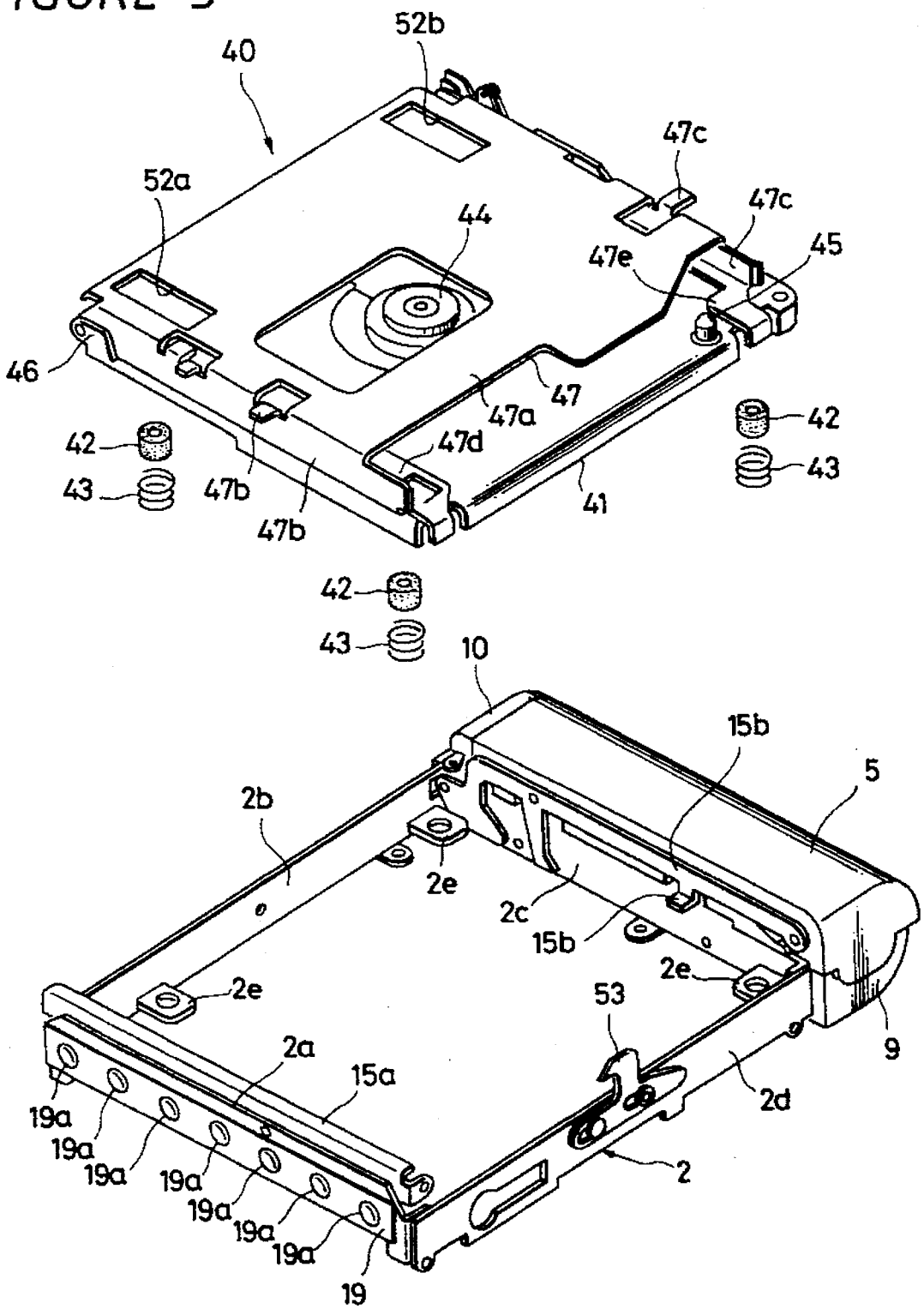
FIG. 3 is an exploded perspective view of a chassis and a mechanical deck portion of the disc player according to the embodiment of the present invention.
Figure 4:
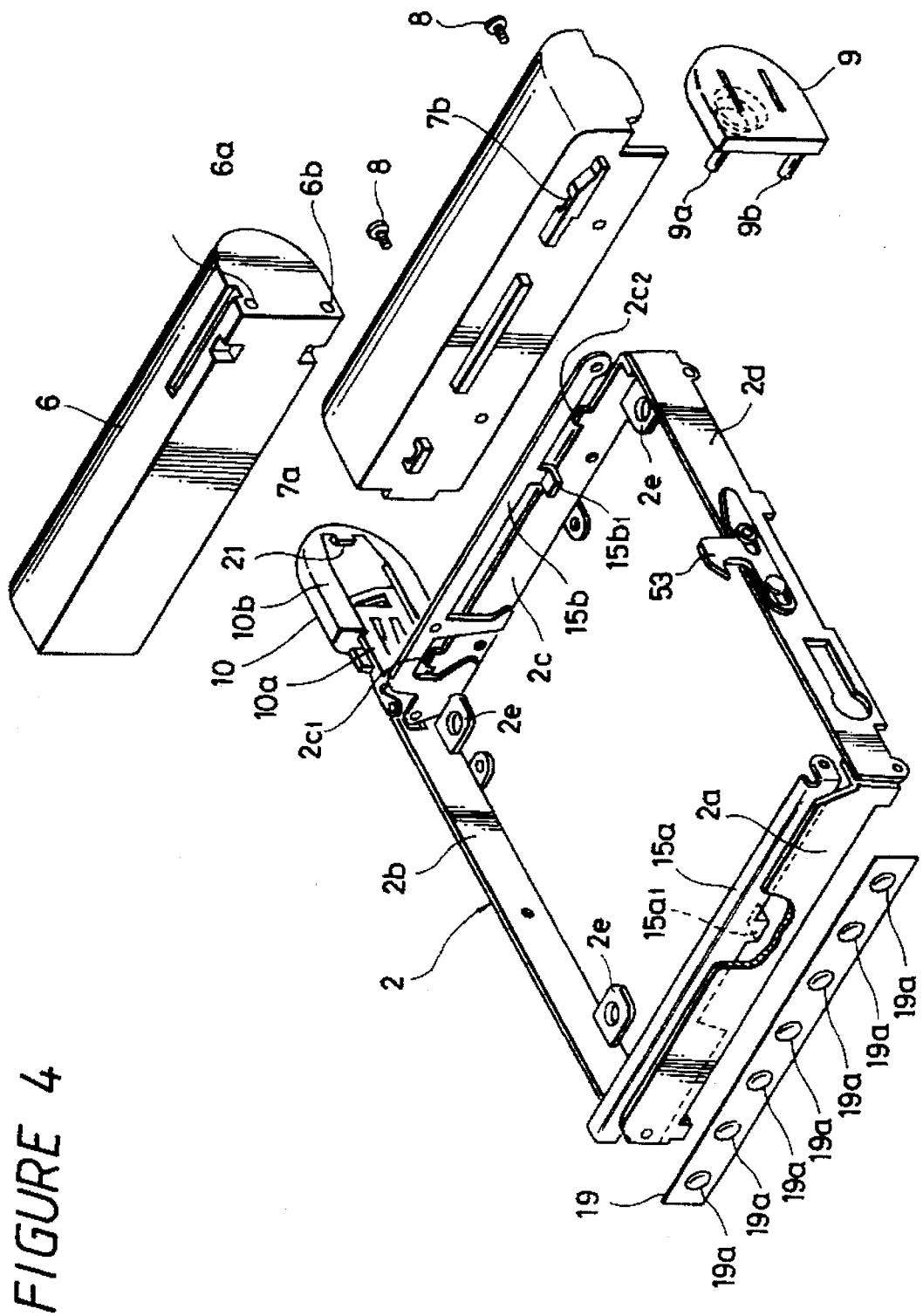
FIG. 4 is an exploded perspective view of the chassis and a battery case portion of the disc player according to the embodiment of the present invention.

In FIGS. 2 to 4, reference numeral 2 designates a main chassis (hereinafter simply referred to as a chassis) which serves as a fundamental framework of the disc player 1. As shown in FIGS. 3 and 4, the chassis 2 is of a frame which comprises four side wall portions, i.e., a left side wall portion 2a, a rear side wall portion 2b, a right side wall portion 2c and a front side wall portion 2d each composed of a thin sheet metal.

The left side wall portion 2a, the rear side wall portion 2b, the right side wall portion 2c of the chassis 2 are formed by bending a sheet metal in a U-shaped fashion to which a piece of sheet metal forming the front side wall portion 2d is fixed, thereby forming a frame-shaped chassis 2 having four walls.

A disc drive mechanism portion 40 on which the disc cartridge 101 is loaded is accommodated within the chassis 2. The disc drive mechanism portion 40 will be described more fully later on.

To the lower surface of the chassis 2 is fixed a circuit board 3 on which a disc drive circuit and a signal reproducing circuit, not shown, are disposed by screws 4.

Reference numeral 5 denotes a battery case which houses a battery 6 as a power supply of the disc player 1. The battery case 5 is made of a rigid material molded by zinc die casting, for example. The battery case 5 is attached to the right side wall portion 2c of the chassis 2.

A structure of a portion in which the battery case 5 and the chassis 2 are secured to each other will be described more in detail with reference to FIG. 4. Projected portions 2c1, 2c2 are projected from the upper edge of the right side wall portion 2c of the chassis 2. On the other hand, vertically elongated engagement apertures 7a, 7b are formed on the side wall of the battery case 5 in association with the projected portions 2c1, 2c2. The projected portions 2c1, 2c2 of the chassis 2 are engaged into the engagement apertures 7a, 7b upwardly. Then, the right side wall portion 2c of the chassis 2 and the battery case 5 are fastened together by screws 8 in the direction perpendicular to the direction in which the projected portions 2c1, 2c2 are engaged into the engagement apertures 7a, 7b.

Because the battery case 5 made of a rigid material is fixed to the right side wall portion 2c of the chassis 2 formed as a frame by bending the thin sheet metal, strength of the chassis 2 can be considerably increased as compared with the case where a chassis is not provided with the battery case 5.

The battery 6 that is accommodated into the battery case 5 as the operation power supply is a specially prepared rechargeable battery. The disc drive mechanism portion 40 and electronic circuits on the circuit board 3 are energized by contacting electrodes 6a, 6b formed on one end face of the battery 6 terminals 9a, 9b of an input base plate 9 disposed within the battery case 5.

An opening portion of the battery case 5 through which the battery 6 is loaded or unloaded is opened and/or closed by a battery lid 10 which is pivotally supported to the chassis 2 in the horizontal direction. A structure of the battery lid 10 will be described later on.

The chassis 2 whose strength is increased by fixing the battery case 5 made of the rigid material thereto is covered with a lower lid 11, an upper lid 12 and a panel frame 13 composing the housing of the disc player 1 (See FIG. 2.).

The lower lid 11 is made of an aluminum plate and is of such a size as to cover the lower surface of the chassis 2 and the lower surface of the battery case 5. The lower lid 11 is fixed to the chassis 2 and the battery case 5 by screws 14.

The chassis 2 includes on its rear portion pivotally supported a pair of arms 15a, 15b each made of a sheet metal so that the pair of arms 15a, 15b can be rotated in the vertical direction (upper and lower direction). The upper lid 12 is formed of the aluminum plate and covers the upper surface of the chassis 2. The upper lid 12 is secured to the pair of arms 15a, 15b by screws 16. Specifically, the upper lid 12 can be rotated in the upper and lower direction relative to the chassis 2 and arranged as an openable and closable lid which opens and closes the disc cartridge loading portion of the disc drive mechanism portion 40.

The panel frame 13 disposed between the lower lid 11 and the upper lid 12 is a U-shaped frame made of a hard plastic material so that the panel frame 13 can be extended along the left side wall portion 2a, the rear side wall portion 2b and the front side wall portion 2d of the chassis 2. The panel frame 13 is fixed to the outer peripheral surface of the chassis 2 by screws 17.

The panel frame 13 includes at its central wall portion facing to the left side wall portion 2a of the chassis 2 provided a variety of operation buttons 18, i.e., six kinds of operation buttons, such as PLAY, FAST FORWARD, REVERSE, PAUSE, STOP and VOLUME ADJUSTMENT of the disc. Operation of the disc is switched and volume is adjusted by depressing touch-sensitive switches 19a fixed to the left side wall portion 2a of the chassis 2 with the respective operation buttons 18.

As described above, in the disc player 1 according to this embodiment, strength of the chassis 2 is increased by fixing the battery case 5 made of the rigid material to the frame-shaped chassis 2 made of the thin sheet metal. Further, the lower lid 11 is made of aluminum and is fixed across the chassis 2 and the battery case 5. The upper lid 12 is made of aluminum and is attached to the upper surface of the chassis 2. Furthermore, the panel frame 13 made of the hard plastic material is fixed to the outer peripheral surface of the chassis 2. Consequently, according to the present invention, it is possible to construct the disc player which can generally be made small, thin and light and whose strength can be made sufficient in actual practice.

The disc player structure according to this embodiment uses special structures for the pivot portion of the battery lid 10 that opens and closes the battery case 5 and the pivot portion of the upper lid 12 that opens and closes the disc loading portion in order to miniaturize disc player.

These structure portions will be described with reference to FIG. 5.

Figure 5:
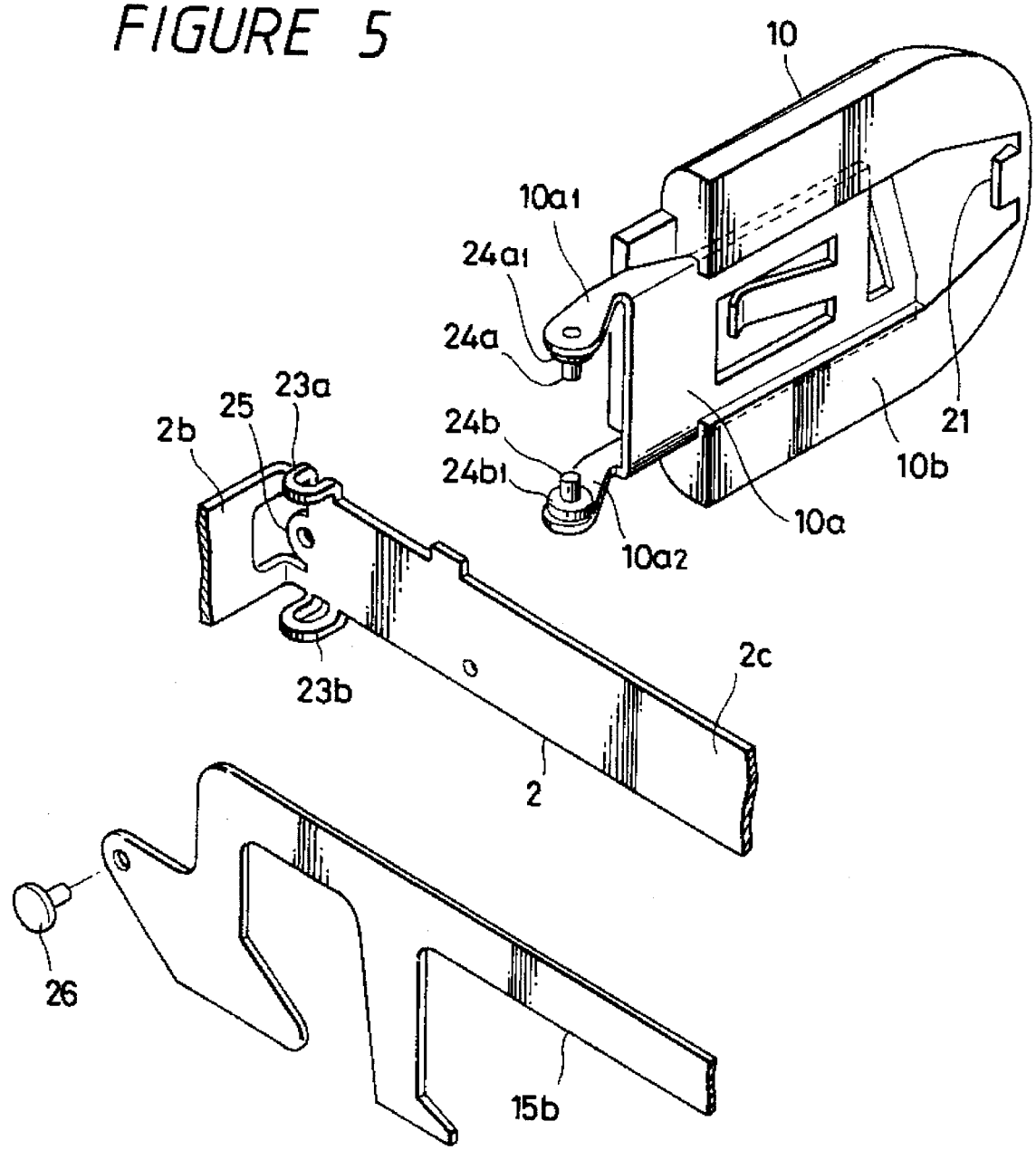
FIG. 5 is an exploded perspective view of a battery lid and a pivot portion of an upper lid of the disc player according to the embodiment of the present invention.

As shown in FIG. 5, the battery lid 10 comprises a rotating plate 10a pivotally supported to the chassis 2 so as to open and close the opening portion of the battery case 5 and a lid body 10b attached to the rotating plate 10a which is slidable along the surface direction of the rotating plate 10a in a predetermined range.

Figure 6:
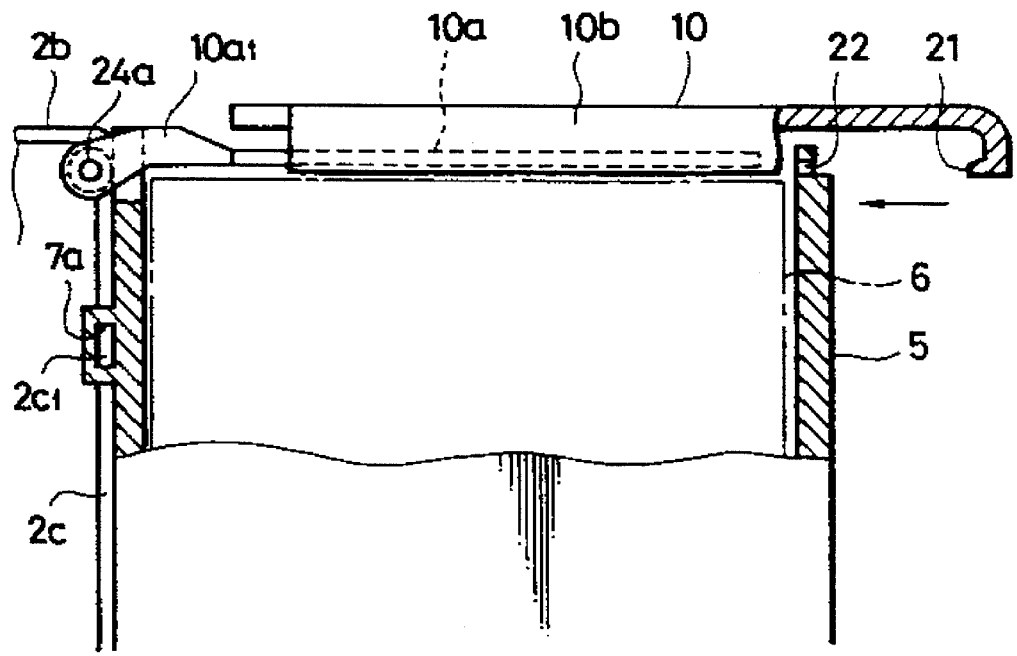
FIG. 6 is a plan view, partly in cross-sectional form, of the battery lid of the disc player according to the embodiment of the present invention.

The lid body 10b includes an engagement protrusion 21 formed at the tip end portion thereof. On the other hand, the battery case 5 includes at its opening edge an engagement aperture 22 bored as shown in FIG. 6. The battery lid 10 closes the opening portion of the battery case 5 under the condition that the lid body 10b is moved to the free end portion side of the rotating plate 10a. Then, the battery lid 10 is locked by engaging the engagement protrusion 21 with the engagement aperture 22 after the lid body 10b is moved to the base end portion side of the rotating plate 10a.

The pivot portion of the thus arranged battery lid 10 relative to the chassis 2 is provided at substantially the same portion as one pivot portion of the upper lid 12.

As shown in FIG. 5, first bearing portions 23a, 23b to which the battery lid 10 is pivotally supported are symmetrically formed on upper and lower edges of the right side wall portion 2c near the bent portion between the rear side wall portion 2b and the right side wall portion 2c of the chassis 2. A second bearing portion 25 that pivotally supports the right arm 15b to which the upper lid 12 is attached is formed between the upper and lower first bearing portions 23a and 23b.

The first bearing portions 23a, 23b that pivotally support the battery lid 10 are projected as a U-shaped member in which the base portion is erected vertically and the tip end portions are inwardly bent in the horizontal direction. In association therewith, upper and lower projected portions 10a1, 10a2 projected on the base end portion of the rotating plate 10a of the battery lid 10 include supporting shafts 24a, 24b projected therefrom in an opposing relation. The upper and lower supporting shafts 24a, 24b can be assembled with ease when the upper and lower supporting shafts 24a, 24b are inserted into and engaged with the first bearing portions 23a, 23b from the lateral direction.

Figure 7:
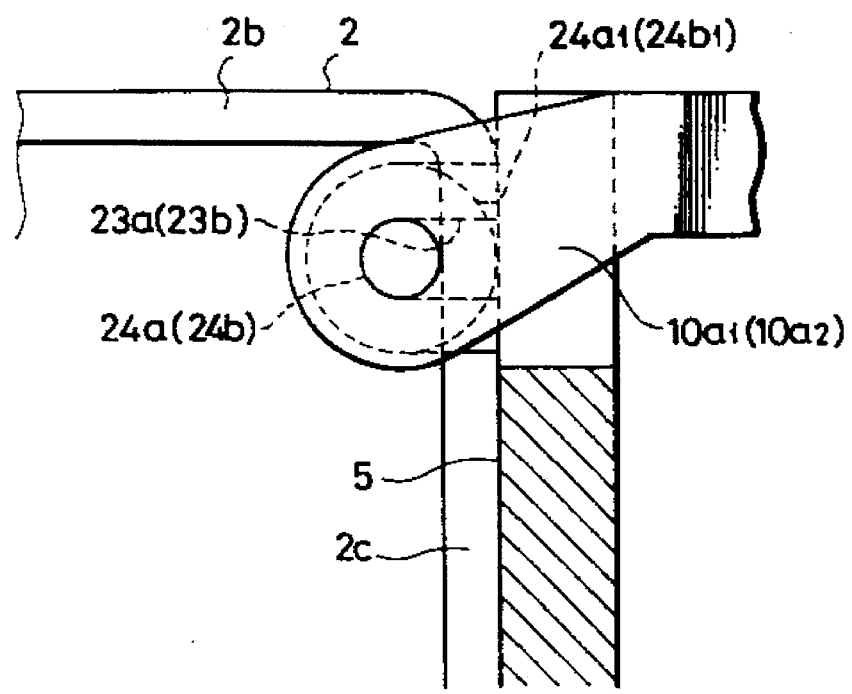
FIG. 7 is a plan view of the pivot portion of the battery lid of the disc player according to the embodiment of the present invention.

In this structure, flange portions 24a1, 24b1 are respectively formed on the root portions of the supporting shafts 24a, 24b. When the battery case 5 is fixed to the right side wall portion 2c of the chassis 2 after the supporting shafts 24a, 24b have been engaged with the first bearing portions 23a, 23b, the flange portions 24a1, 24b1 are brought in contact with a portion of the battery case 5. Thus, the battery lid 10 can be assembled accurately without wobbling became the supporting shafts 24a, 24b are prevented from being disengaged from the first bearing portions 23a, 23b (see FIG. 7).

The second bearing portion 25 that pivotally supports the arm 15b, to which the upper lid 12 is attached, is projected in an erected tab fashion between the first bearing portions 23a and 23b in the direction perpendicular to the first bearing portions 23a, 23b. The arm 15b is pivotally supported by a caulking pin 26 to the second bearing portion 25 so that the arm 15b can be rotated in the vertical direction.

According to the structure of the present invention, the pivot portions of the battery lid 10 and the upper lid 11 whose rotating directions are different are efficiently disposed on the chassis 2 and the space can effectively be used, thereby the disc player is advantageously miniaturized.

Further, in the disc player 1 according to this embodiment, provides a structure wherein the portions in which the operation buttons 18 are disposed on the panel frame 13 have sufficient strength.

The structure of the panel frame 13 will be described with reference to FIGS. 8 and 9.

As illustrated, the panel frame 13 includes concave portions 27 corresponding to the operation buttons 18. The operation buttons 18 are properly disposed in the concave portion 27.

Each operation button 18 includes on its rear surface two kinds of pins 28, 29. The pins 28, 29 are faced to the inner surface of the panel frame 13 via through-holes 30, 31 bored on the bottom portion of the concave portion 27. Of the two kinds of the pins 28, 29, one pin 28 is opposed to the touch-sensitive switch 19a of the switch base plate 19 fixed to the left side wall portion 2a of the chassis 2. The other pin 29 is coupled to a plate spring 32 fixed to the inner side surface of the panel frame 13.

Figure 8:
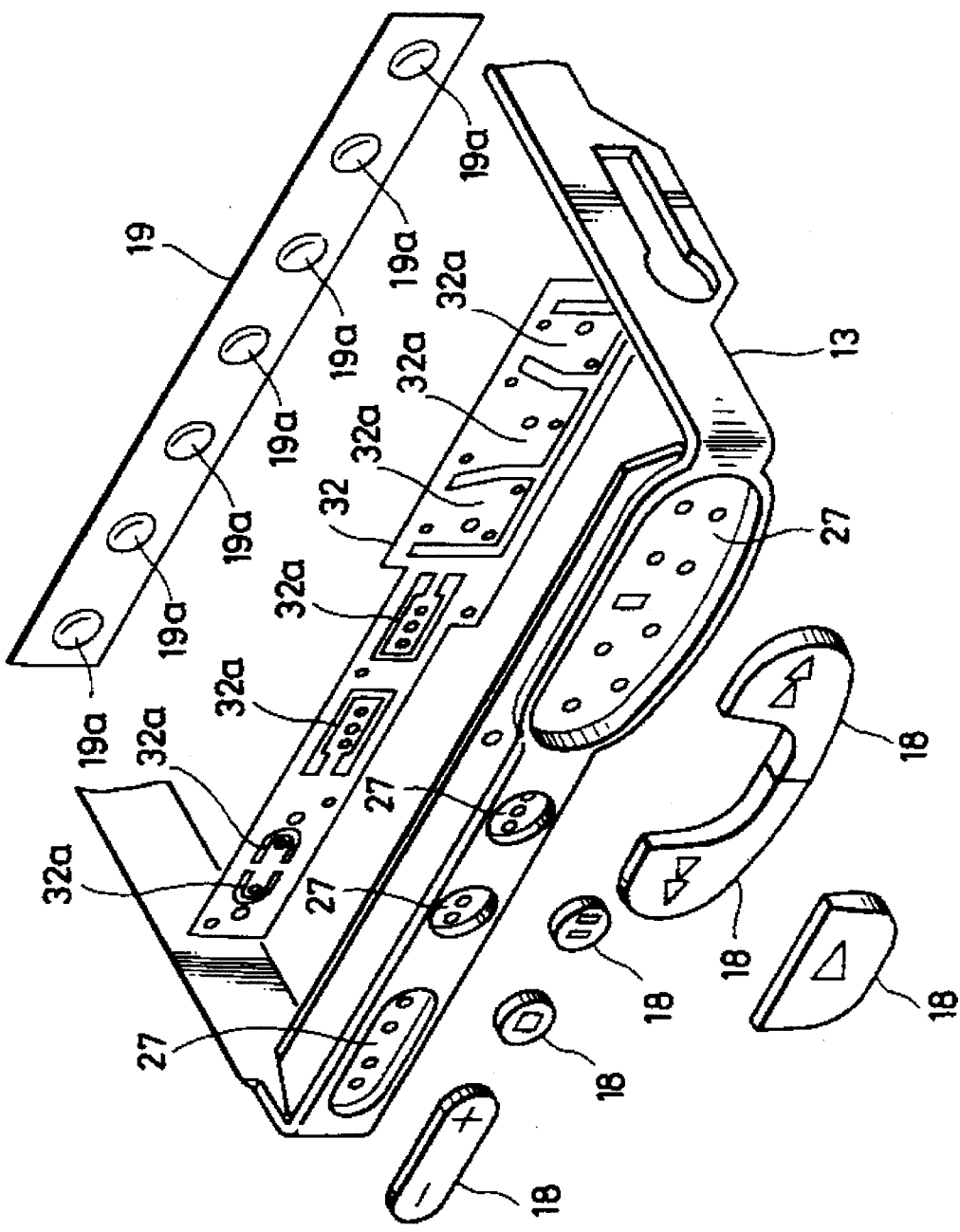
FIG. 8 is an exploded perspective view of a panel frame at its portion in which operation buttons are disposed.
Figure 9:
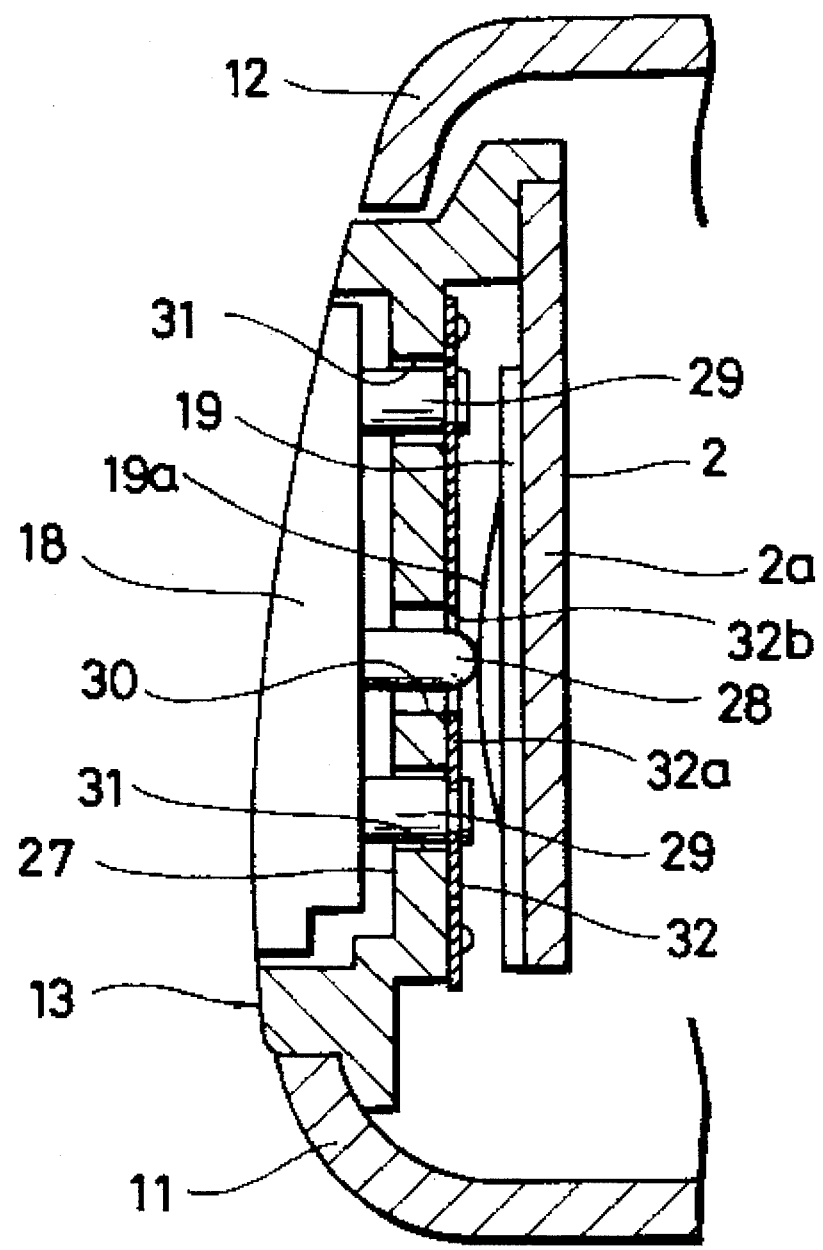
FIG. 9 is a longitudinal cross-sectional view of the panel frame at its portion in which the operation buttons are disposed.

As shown in FIG. 8, the plate spring 32 includes flexible portions 32a formed by predetermined slits in accordance with the respective operation buttons 18. The pin 29 of each operation button 18 is connected and fixed to the flexible portion 32a by melt-bonding caulking. Each operation button 18 is urged to return to the original state under spring force of the flexible portion 32a of the plate spring 32. Also, the pin 28 is brought in contact with the touch-sensitive switch 19a via a through-hole 32b bored through the plate spring 32.

When the operation button 18 is depressed against the spring force of the plate spring 32, the touch-sensitive switch 19a corresponding to the operation button 18 is energized and various operations of the disc, i.e., PLAY, FAST FORWARD, REVERSE, PAUSE, STOP are switched or volume is adjusted by VOLUME ADJUSTMENT.

With the above-mentioned arrangement, the panel frame 13 according to this embodiment will have sufficient strength as compared with the attachment structure of the ordinary operation button 18.

Specifically, in the ordinary structure, the panel frame 13 includes the through-holes through which the operation buttons 18 are entered. According to the embodiment of the present invention, since the strength of the panel frame 13 is considerably lowered at the lightening hole portions formed by the through-holes, the concave portion 27 is used as the to accommodate the operation buttons 18 in the panel frame 13. In this way, the fundamentally important portions of the panel frame 13 are maintained, thereby making it possible to avoid lowering strength of the panel frame 13.

The strength of the panel frame 13 is sufficiently maintained, which can considerably contribute to an increased strength the disc player 1 on the whole.

An arrangement of the disc drive mechanism portion 40 that is accommodated in the chassis 2 will be described with reference to FIGS. 3 and 11.

Figure 11:
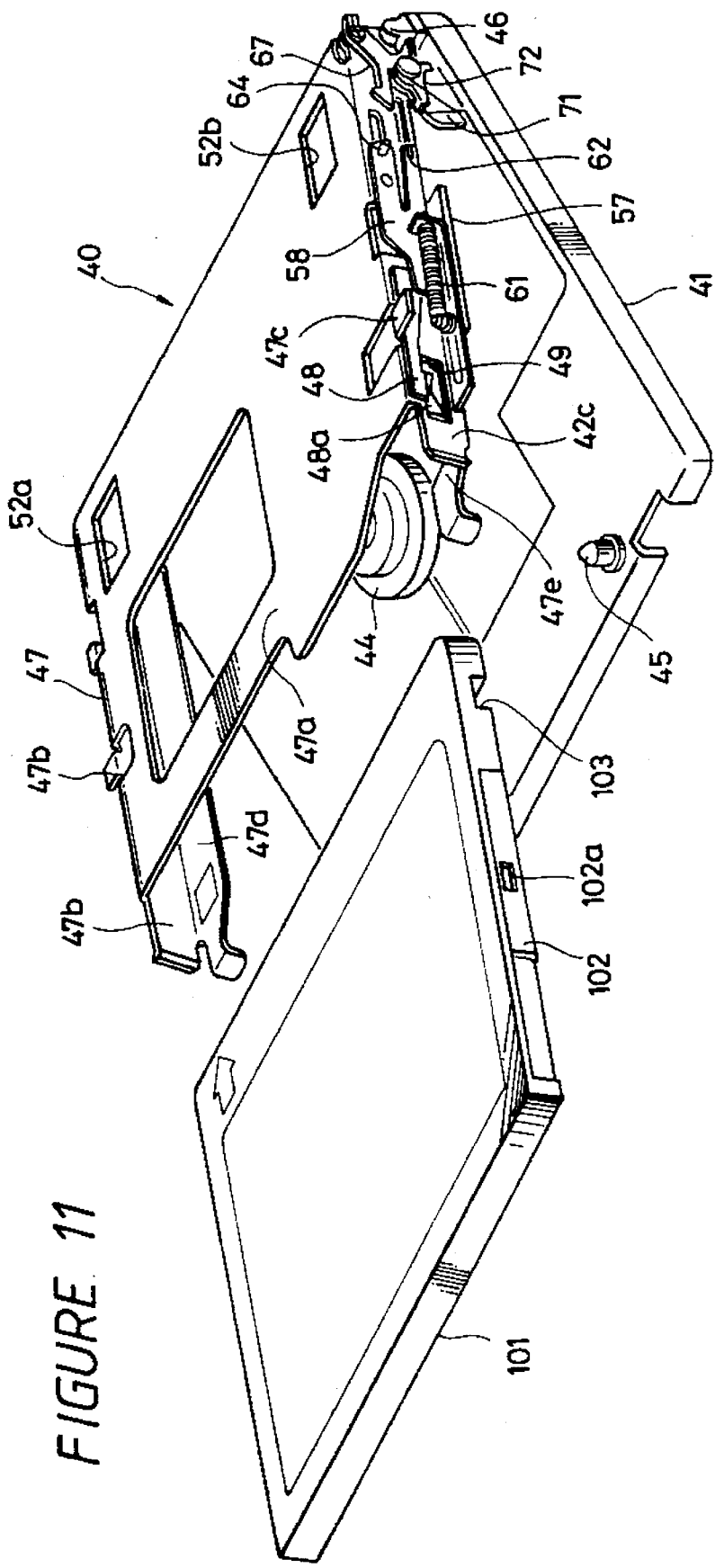
FIG. 11 is a perspective view of a mechanical deck portion of the disc player according to the embodiment of the present invention.

In FIGS. 3 and 11, reference numeral 41 depicts a mechanical chassis which serves as a base plate of the disc drive mechanism portion 40. The mechanical chassis 41 is supported to supporting members 2e projected from the inner surface side of the chassis 2 at a plurality of positions in the horizontal direction through a damping mechanism in a floating state. The damping mechanism is composed of a rubber damper 42 and a coil spring 43.

On the mechanical chassis 41 are disposed a turntable 44 on which the disc 100 is held and which is rotated by a spindle motor (not shown) and an optical pickup (not shown) for reading a signal from the disc 100. Reference numeral 45 depicts a positioning pin projected on the mechanical chassis 41. While only one positioning pin 45 is illustrated, there are provided a pair of positioning pins 45 in actual practice.

The mechanical chassis 41 includes at its bearing portion 46 formed at the rear end thereof a cartridge holder 47 for holding the disc cartridge 101 pivotally supported in the upper and lower direction.

The cartridge holder 47 comprises an upper surface plate portion 47a, two side plate portions 47b, 47c downwardly bent from the left and right sides of the upper surface plate portion 47a at a right angle. The cartridge holder 47 further include lower supporting plate portions 47d, 47e projected from the inner lower ends of the two side plate portions 47b, 47c at a right angle which are integrally formed therewith. The disc cartridge 101 is inserted into the cartridge holder 47 under the condition that the cartridge holder 47 is rotated with a predetermined angle relative to the mechanical chassis 41. Then, the cartridge holder 47 is downwardly rotated so as to overlap the mechanical chassis 41 from the abovementioned state, whereby the disc cartridge 101 is loaded on the mechanical chassis 41 at its predetermined loading position. Specifically, when the disc cartridge 101 is properly positioned by engaging reference apertures formed on the lower surface of the disc cartridge 101 with the positioning pins 45, the disc 100 will be held with its central portion exposed to the lower surface side of the disc cartridge 101 on the turntable 44.

Figure 12:
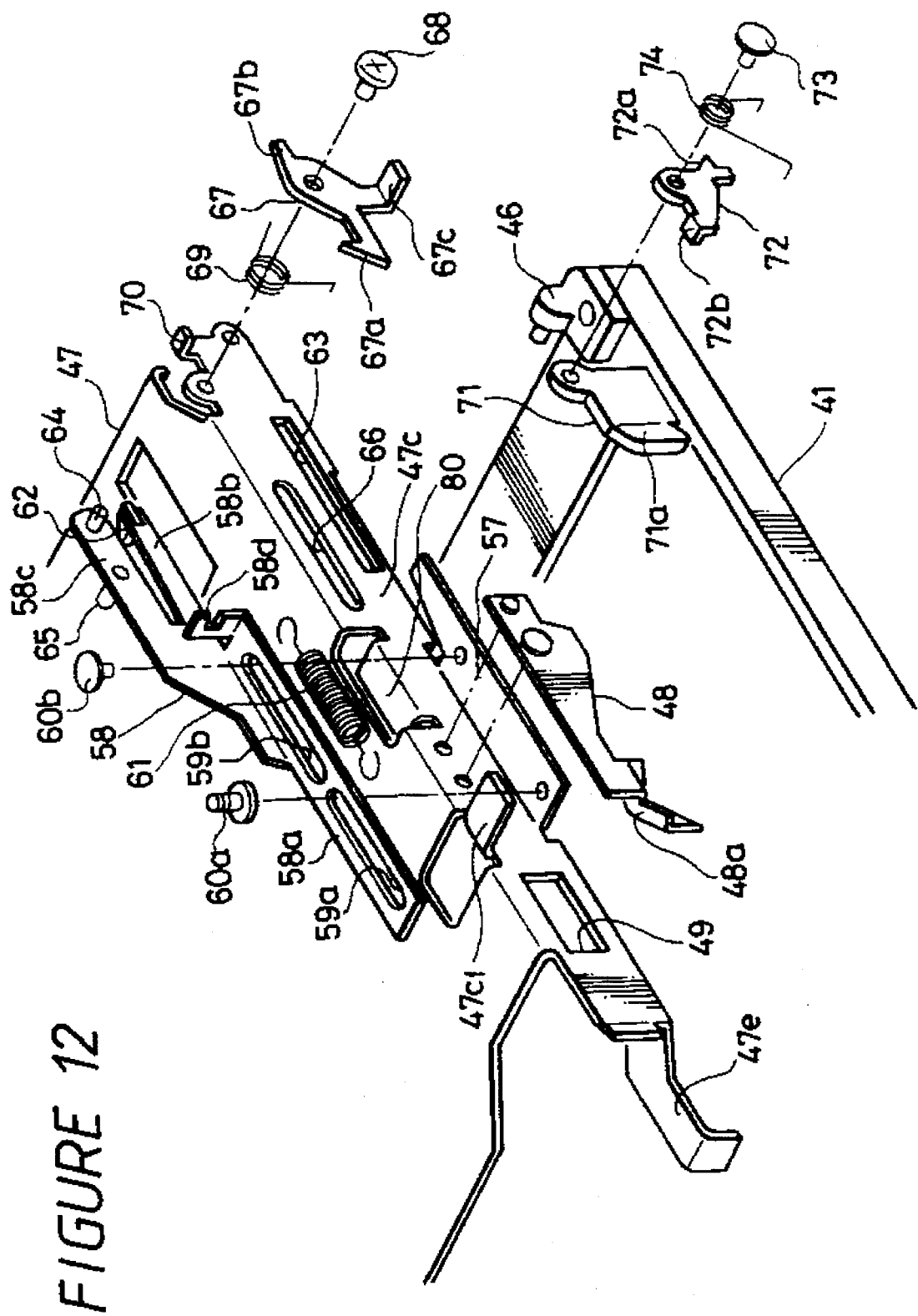
FIG. 12 is an exploded perspective view of an eject mechanism portion of the disc player according to the embodiment of the present invention.

Referring not to FIG. 12, the cartridge holder 47 includes on its right side plate portion 47c a shutter releasing member 80 projected to the inner portion of the cartridge holder 47 to release a slide shutter 102.

The cartridge holder 47 includes on the outer surface side of the right side plate portion 47c an attached shutter closing lid member 48. The shutter closing lid member 48 is formed of a sheet metal, and a convex portion 48a of the shutter closing lid member 48 is projected to the inner portion of the cartridge holder 47 via a through-hole 49 of the right side plate portion 47c of the cartridge holder 47.

Figure 13:
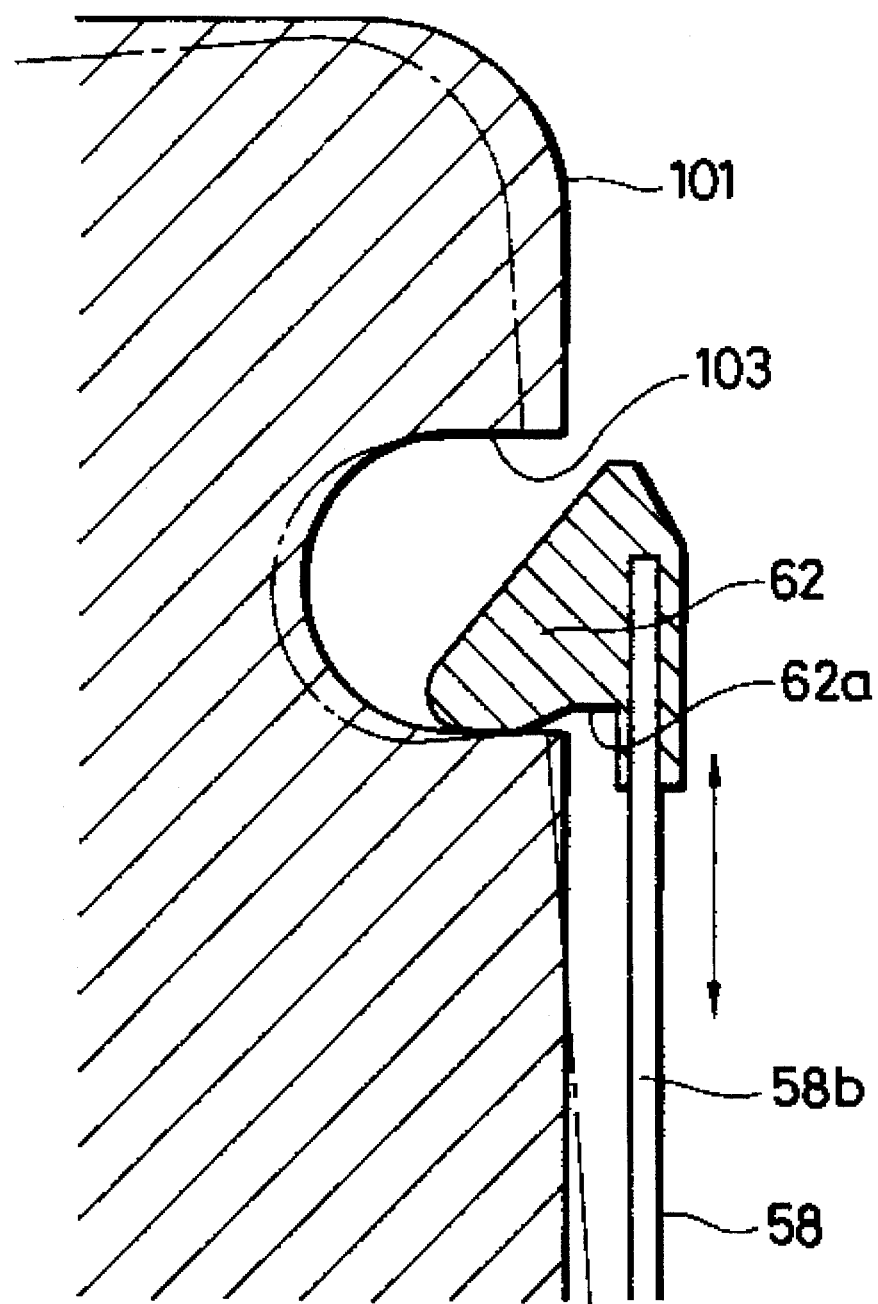
FIG. 13 is a diagram used to explain engagement between an engagement tab of an eject lever of the eject mechanism and a concave portion of the disc cartridge.

Referring to FIGS. 12 and 13 when the disc cartridge 101 is inserted into the cartridge holder 47, the disc cartridge 101 is inserted into the cartridge holder 47 while the shutter 102 slides at its side surface along the convex portion 48a of the shutter closing lid member 48. When the disc cartridge 101 is inserted into the cartridge holder 47 up to its predetermined position, the convex portion 48a is engaged with the engagement aperture 102a of the shutter 102 and the shutter releasing member 80 is inserted into a groove (not shown) formed on one side surface of the disc cartridge 101 and is thereby brought in contact with a shutter locking member (not shown) provided within the disc cartridge 101. Thus, the shutter releasing member 80 releases the shutter 102 from being locked by the shutter locking member and is brought in contact with the shutter 102. As a consequence, in accordance with the insertion of the disc cartridge 101, the shutter 102 is moved by the shutter releasing member 80 to expose a part of the disc 100 from the opening portion formed on the lower surface of the disc cartridge 101. Thus, a part of the disc 100 is opposed to an optical pickup (not shown).

When the disc cartridge 101 is ejected from the cartridge holder 47, owing to the action of the shutter closing lid member 48 that is engaged with the engagement aperture 102a of the shutter 102 after the disc cartridge 101 has been inserted into the cartridge holder 47, the shutter 102 is closed as the disc cartridge 101 is ejected from the cartridge holder 47.

Although the rotation supporting point of the cartridge holder 47 and the rotation supporting point of the upper lid 12 are set at slightly displaced positions in the disc player 1 according to this embodiment, the cartridge holder 47 is rotated in unison with the opening and/or closing operation of the upper lid 12.

Specifically, the cartridge holder 47 includes projected portions 47b1, 47c1 projected from left and right side plate portions 47b, 47c in the horizontal direction. The left and right arms 15a, 15b to which the upper lid 12 is fixed include projected portions 15a1, 15b1 inwardly projected in the horizontal direction. The projected portions 15a1, 15b1 are opposed to the lower portions of the projected portions 47b1, 47c1 of the cartridge holder 47. When the upper lid 12 is opened, the projected portions 15a1, 15b1 of the arms 15a, 15b come in contact with the projected portions 47b1, 47c1 of the cartridge holder 47 to elevate the projected portions 47b1, 47c1. As a consequence, the cartridge holder 47 is rotated in the upper direction following the upper lid 12. Maximum opening angles of the upper lid 12 and the cartridge holder 47 are set to 25° and 20°, respectively.

Figure 10:
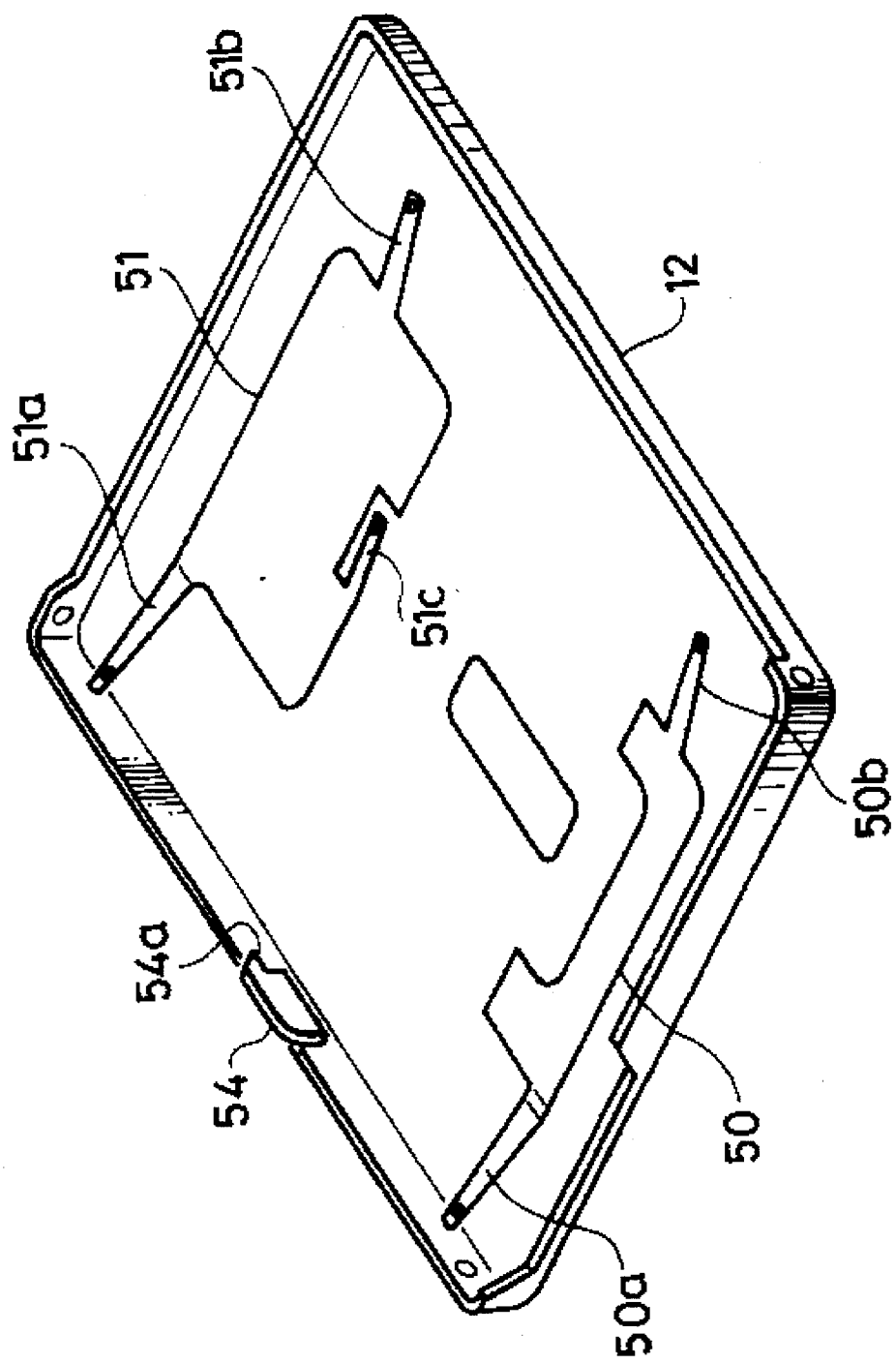
FIG. 10 is a perspective view showing the rear surface of the upper lid of the disc player according to the embodiment of the present invention.

Referring to FIG. 10, the upper lid 12 includes left and right plate spring members 50, 51 fixed to its rear surface as shown in FIG. 10. The plate spring members 50, 51 include resilient projection portions 50a, 50b and 51a, 51b projected therefrom in the front to back direction. The right plate spring member 51 includes a resilient projection portion 51c projected at its central portion.

The resilient projection portions 50a, 50b, 51a, 51b are within inclination so that they are floated from the inner surface of the upper lid 12. When the upper lid 12 is closed, the resilient projection portion 51c of the right plate spring member 51 comes in contact with the upper surface plate portion 47a of the cartridge holder 47 to push the cartridge holder 47 in a downward direction. As a consequence, the cartridge holder 47 is rotated in the downward direction following the upper lid 12.

When the upper lid 12 is closed completely, the central resilient projection portion 51c of the right plate spring member 51 urges the cartridge holder 47 against the mechanical chassis 41 side and the resilient projection portions 50a, 50b and 51a, 51b of the two plate spring members 50, 51 urge the disc cartridge 101 against the mechanical chassis 41 side. Thus, the disc cartridge 101 can reliably be loaded onto the disc cartridge loading portion on the mechanical chassis 41 without wobbling.

With the above-mentioned arrangement, the front resilient projection portions 50a, 51a of the plate spring members 50, 51 are brought in contact with the disc cartridge 101 in front of the cartridge holder 47. The rear resilient projected portions 50b, 51b are brought in contact with the disc cartridge 101 through left and right through-holes 52a, 52b bored through the upper surface plate portion 47a of the cartridge holder 47.

Referring to FIGS. 2, 3 and 10, the upper lid 12 is locked by a lock mechanism under the condition that it is closed completely. The lock mechanism comprises a hook-shaped lock member 53 provided on the center of the front side wall portion 2d of the chassis 2 and an engagement plate 54 fixed to the inner surface side of the front end of the upper lid 12 to be engageable with the lock member 53. When the upper lid 12 is closed completely, the upper lid 12 is locked by engaging an engagement concave portion 54a of the engagement plate 54 with the lock member 53.

When the upper lid 12 is released from the locked state, it is possible to open the upper lid 12 by sliding a lock release operation member 55 provided in the panel frame 13 to disengage the lock member 53 from the engagement plate 54.

When the upper lid 12 is released from the locked state and the upper lid 12 is opened, if the disc cartridge 101 is loaded onto the cartridge holder 47, then the disc cartridge 101 is ejected from the cartridge holder 47.

An arrangement of an eject mechanism of this disc cartridge holder 47 will be described in detail with reference to FIG. 12.

As shown in FIG. 12, the cartridge holder 47 includes on its right side plate portion 47c a unitarily formed supporting plate portion 57 projected from the lower end in the horizontal direction. The supporting plate portion 57 includes an eject lever 58 formed of a sheet metal supported thereto so as to become slidable in the front and rear direction, i.e., in the same direction as the direction in which the disc cartridge 101 is loaded onto and/or ejected from the cartridge holder 47.

The eject lever 58 comprises a base plate portion 58a extended along the supporting plate portion 57 of the cartridge holder 47. The eject lens 58 further includes resilient plate portion 58b and an extended plate portion 58c vertically erected from the front end portion of the base plate portion 58a along the right side plate portion 47c of the cartridge holder 47. Portions 58a, b, c are integrally formed. Guide elliptic apertures 59a, 59b formed in the longitudinal direction of the base plate portion 58a are guided by guide pins 60a, 60b fixedly implanted on the supporting plate portion 57 of the cartridge holder 47 so that the eject lever 58 can be slid in a predetermined range in the front and back direction.

The base plate portion 58a of the eject lever 58 includes a spring stop protrusion 58d projected from the front end thereof. A tension coil spring 61 is extended between the spring stop protrusion 58d and the front guide pin 60a. The eject lever 58 is constantly biased in the forward direction, i.e., in the eject direction of the disc cartridge 101 under spring force of the tension coil spring 61.

The resilient plate portion 58b of the eject lever 58 includes on its tip end portion an engagement tab 62 made of a resin to be engaged with the concave portion 103 formed on the side portion of the disc cartridge 101. The engagement tab 62 is integrally formed with the eject lever 58 (made of the sheet metal) by outsert molding. The engagement tab 62 is opposed to the inside of the cartridge holder 47 via a though-hole 63 of a rectangular shape bored through the right side plate portion 47c of the cartridge holder 47. Under the condition that the disc cartridge 101 is inserted into the cartridge holder 47, as shown in FIG. 13, the engagement tab 62 is in engagement with the concave portion 103 of the disc cartridge 101, whereby the eject lever 58 is slid in unison with the disc cartridge 101.

The engagement tab 62 of the eject lever 58 includes, in particular, an undercut portion 62a as shown in FIG. 13. Specifically, the engagement tab 62 is undercut in concave shape at its root portion in which it is opposed to the concave portion 103 of the disc cartridge 101.

Because the engagement tab 62 has the undercut portion 62a, the engagement tab 62 can be easily engaged with the concave portion 103 of the disc cartridge 101 reliably. Therefore, even when the disc cartridge 101 is inserted into the cartridge holder 47 with a slight inclination due to wobbling within the cartridge holder 47 as shown by a one-dot phantom line in FIG. 13, the engagement tab 62 will still engage with the concave portion 103. Thus, the engagement state between the engagement tab 62 and the concave portion 103 can be maintained reliably.

The eject lever 58 includes a lock pin 64 on the outer surface tip end portion side of the extended plate portion 58c. The lock pin 64 is engaged with a lock member 67 which will be described later on. Further, the extended plate portion 58c includes a guide pin 65 implanted on the inner surface side. The guide pin 65 is engaged with the guide rectangular opening 66 bored through the right side plate portion 47c of the cartridge holder 47 and is thereby guided so that the lock pin 64 is accurately opposed to and engaged with the lock member 67.

The lock member 67 is pivotally supported by a shaft pin 68 at the rear end portion of the right side plate portion 47c of the cartridge holder 47. The lock member 67 includes on its tip end portion a tab portion 67a that is engaged with the lock pin 64 of the eject lever 58.

The shaft pin 68 to which the lock member 67 is pivotally supported includes a torsion coil spring 69 mounted thereon. One end portion of the torsion coil spring 69 is engaged with the cartridge holder 47 side and the other end portion thereof is engaged with the lock member 67 side. Thus, the lock member 67 is constantly biased in the clockwise direction in FIG. 12 under spring force of the torsion coil spring 69.

The lock member 67 is locked at a predetermined rotational position, i.e., at the position in which the tab portion 67a is opposed to the lock pin 64 of the eject lever 58 when a part of the projected portion 67b comes in contact with a stopper projection 70 projected toward the cartridge holder 47 side.

The lock member 67 includes an operation member 67c that is used to release engagement between the eject lever 58 and the lock pin 64. A lock releasing mechanism for operating the operation member 67c is disposed on the mechanical chassis 41 side.

This lock releasing mechanism is a so-called ratchet mechanism and releases engagement between the lock member 67 and the lock pin 64 by using rotational operation of the cartridge holder 47.

In association with the lock member 67 of the cartridge holder 47 side, the mechanical chassis 41 includes a vertical wall 71 implanted in tab-shape in an opposing relation to the right side wall plate portion 47c of the cartridge holder 47. The vertical wall 71 includes a ratchet member 72 forming the ratchet mechanism pivotally supported thereto by a shaft pin 73. The ratchet member 72 includes on its one portion provided an action tab 72a opposing the operation member 67c of the lock member 67 and also includes on the other end portion thereof a stopper projection 72b.

A torsion coil spring 74 is attached to the shaft pin 73 to which the ratchet member 72 is pivotally supported. One end portion of the torsion coil spring 74 is engaged with the vertical wall 71 side and the other end portion thereof is engaged with the ratchet member 72 side. The ratchet member 72 is biased in the opposite direction of the lock member 67, i.e., in the counter-clockwise direction shown in FIG. 12 under spring force of the torsion coil spring 74. The ratchet member 72 is locked at a predetermined rotational position, i.e., at the position in which the action tab 72a is opposed to the operation member 67c of the lock member 67 when the stopper member 72b comes in contact with the upper edge portion of the vertical wall 71.

The vertical wall 71 to which the ratchet member 72 is attached is inclined and bent such that a front portion 71a is opened toward the outside. Thus, the vertical wall 71 functions as a guide wall which can smoothly guide the eject lever 58 when the disc cartridge 101 is inserted into the cartridge holder 47.

Operation of the eject mechanism thus arranged will be described in detail below.

Figure 14:
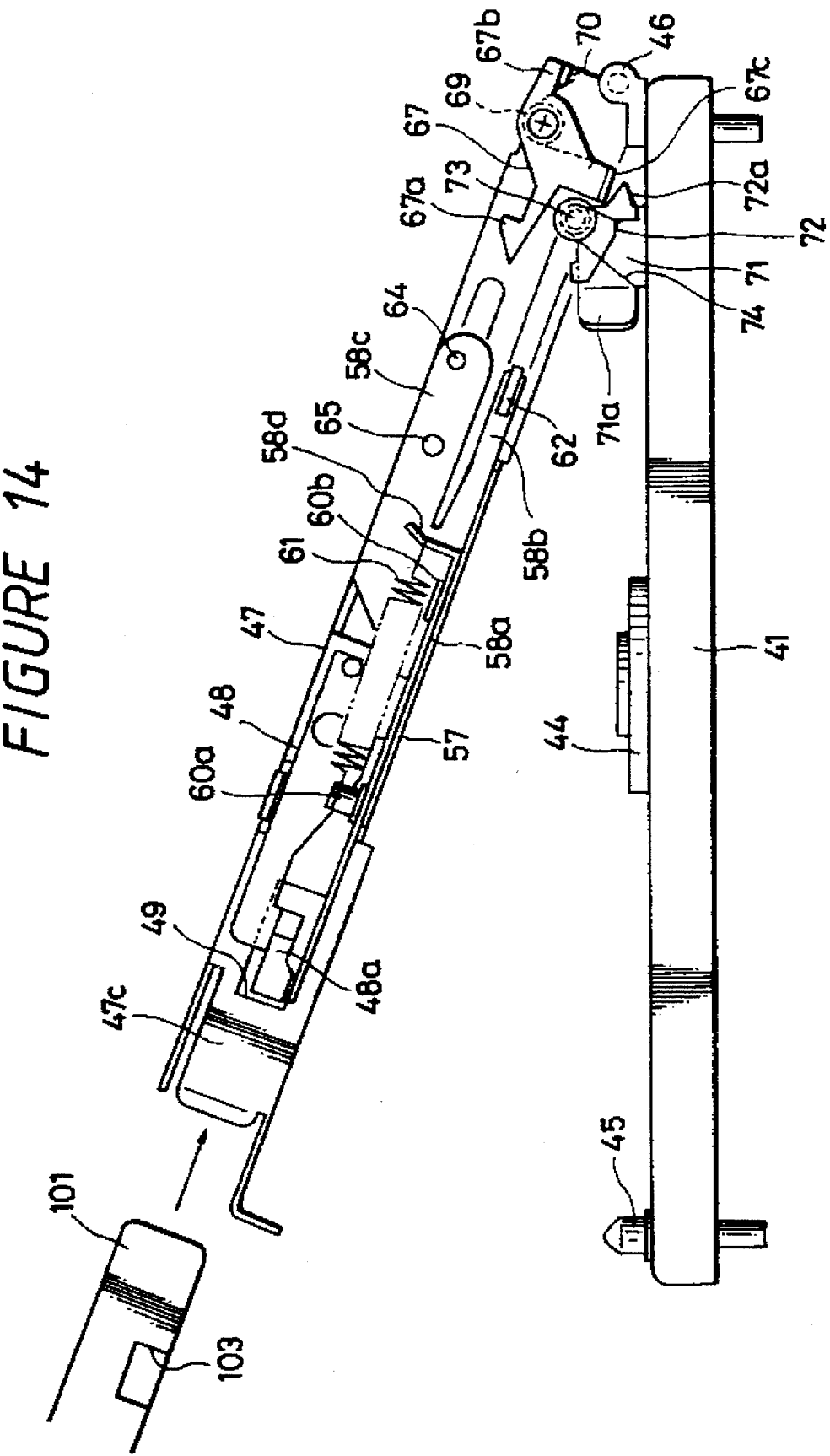
FIG. 14 is a side view used to explain operation of the eject mechanism and illustrating a state in which the disc cartridge has not yet been inserted into the cartridge holder.

Initially, as shown in FIG. 14, when the disc cartridge 101 is inserted into the cartridge holder 47 under the condition that the cartridge holder 47 is elevated relative to the mechanical chassis 41, i.e., under the condition that the upper lid 12 is opened, the engagement tab 62 of the eject lever 58 is engaged with the concave portion 103 of the side portion of the disc cartridge 101. As a result, the eject lever 58 is moved rearwardly in unison with the disc cartridge 101 against the spring force of the tension coil spring 61 at the same time when the disc cartridge 101 is moved.

At that time, engagement between the engagement tab 62 and the concave portion 103 is reliably maintained because the engagement tab 62 of the eject lever 58 includes the undercut portion 62a as described above. As a consequence, even when the disc cartridge 101 is inserted into the cartridge holder 47 with a small wobble, the engagement tab 62 can be prevented from being disengaged from the concave portion 103.

Even if the engagement tab 62 is disengaged from the concave portion 103, the resilient plate portion 58b of the eject lever 58 is guided by the vertical wall 71 of the lock releasing mechanism portion, thereby preventing the engagement tab 62 from being disengaged from the concave portion 103. Therefore, the eject lever 58 can reliably be moved in unison with the disc cartridge 101.

Figure 15:
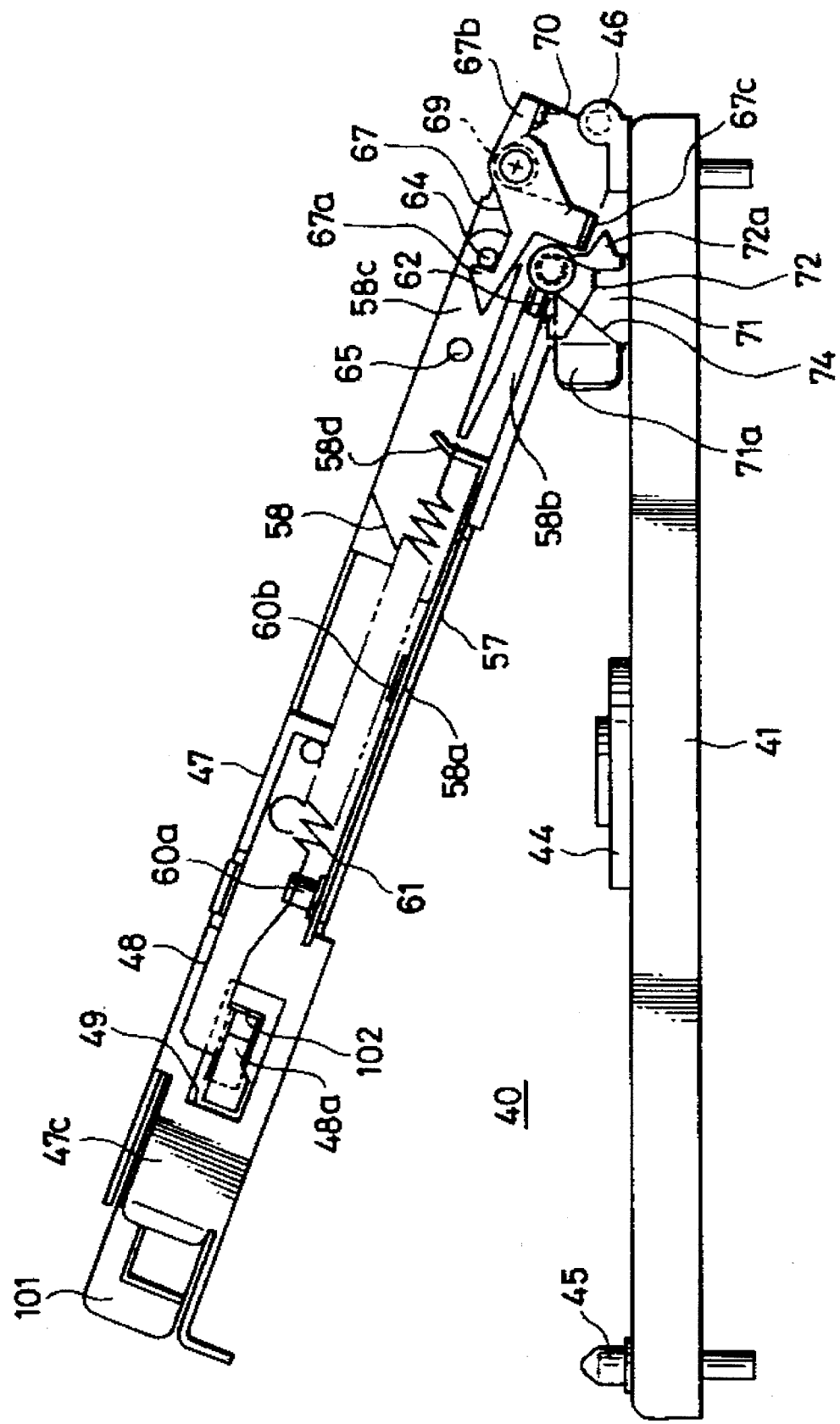
FIG. 15 is a side view used to explain operation of the eject mechanism and illustrating the state in which the disc cartridge is inserted into the cartridge holder.

When the disc cartridge 101 is inserted into the deepest portion of the cartridge holder 47 completely, as shown in FIG. 15, the lock pin 64 of the eject lever 58 is engaged with the tab portion 67a of the lock member 67, thereby the eject lever 58 become locked.

Engagement operation between the lock pin 64 and the lock member 67 will be described more in detail below.

Initially, when the eject lever 58 is moved in the rearward direction, the lock pin 64 contacts with and presses the tip end of the inclined edge of the tab portion 67a of the lock member 67. The lock member 67 is rotated by the pressing force of the lock pin 64 downwardly against the spring force of the torsion coil spring 69. Then, when the lock pin 64 passes the tab portion 67a, the lock member 67 is returned to the original position under spring force of the torsion coil spring 69, whereby the lock pin 64 is engaged with the tab portion 67a. Thus, the eject lever 58 is locked.

Figure 16:
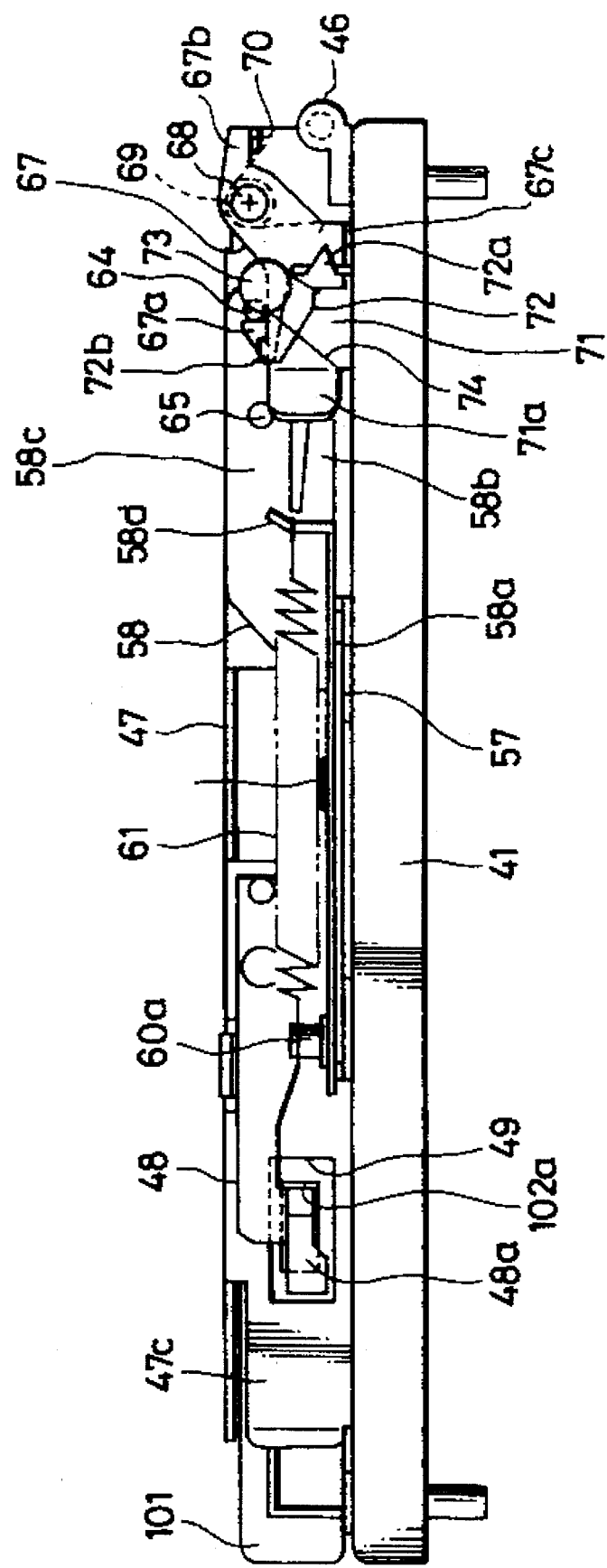
FIG. 16 is a side view used to explain operation of the eject mechanism and illustrating the state that the disc cartridge is loaded onto a predetermined loading portion.

Then, the cartridge holder 47 is rotated in the downward direction by closing the upper lid 12 from the state that the eject lever 58 is locked after the disc cartridge 101 was inserted into the cartridge holder 47 completely. Under the condition that the disc cartridge 101 is loaded onto the disc cartridge loading portion provided on the mechanical chassis 41, as shown in FIG. 16, the operation member 67c of the lock member 67 passes the action tab 72a of the ratchet member 72 and is placed under the action tab 72a.

The operation member 67c of the lock member 67 passes the action tab 72a of the ratchet member 72 as follows.

Because the lock member 67 is restricted by the stopper member 70 from rotating in the clockwise direction, the operation member 67c of the lock member 67 contacts with and presses the operation tab 72a of the ratchet member 72. By the pressing force of the operation member 67c, the ratchet member 72 is rotated in the clockwise direction, i.e., in the direction in which the action tab 72a is pushed by the operation member 67c of the lock member 67 against the spring force of the torsion coil spring 74. As a result, the operation member 67c of the lock member 67 passes the action tab 72a of the ratchet member 72.

Figure 17:
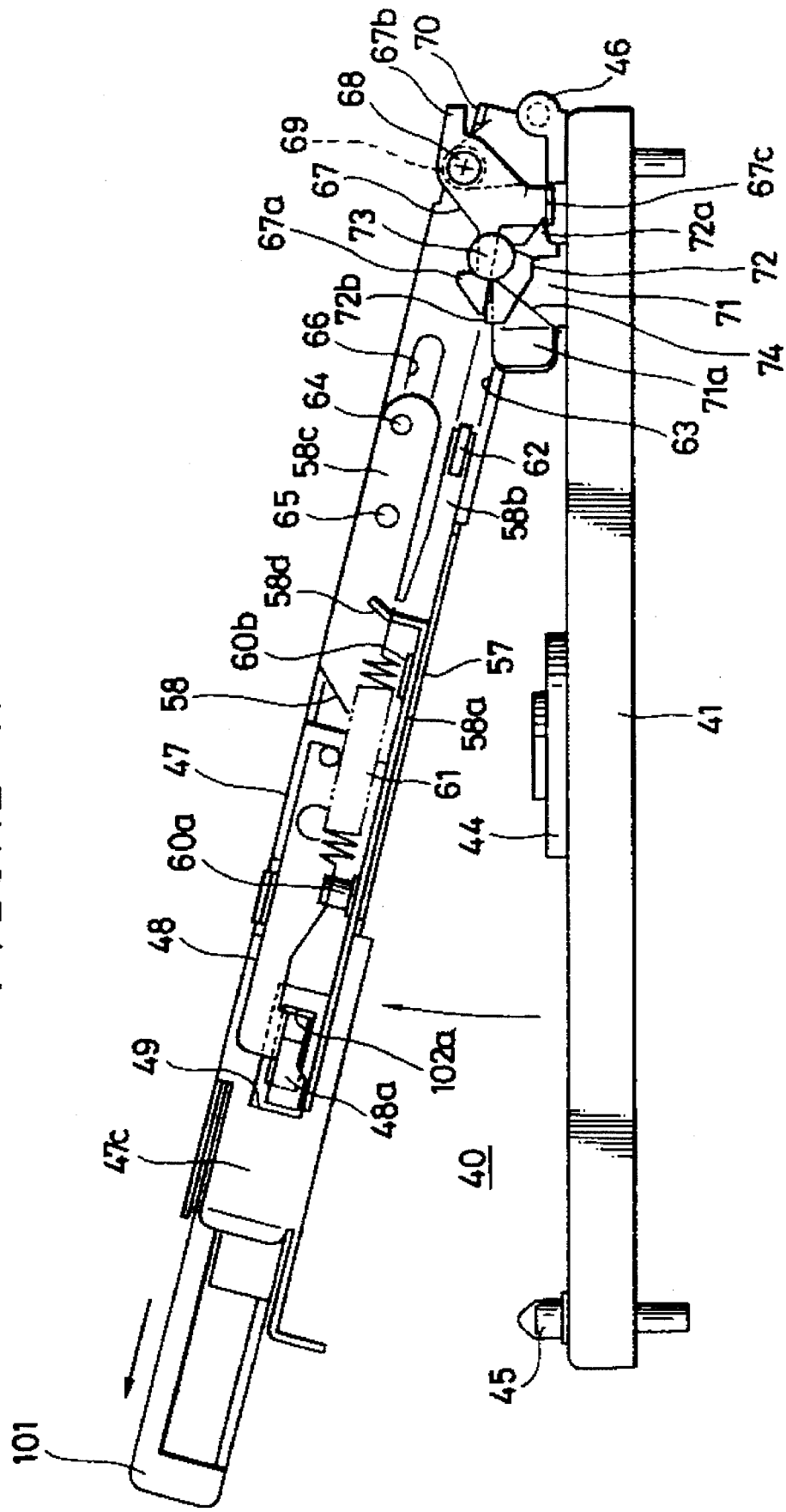
FIG. 17 is a side view used to explain operation of the eject mechanism and illustrating the state that the disc cartridge was ejected from the cartridge holder.

When the cartridge holder 47 is rotated in the upper direction after the upper lid 12 was opened from this state as shown in FIG. 17, the ratchet member 72 is restricted by the stopper member 72b from rotating in the counter-clockwise direction. Therefore, when the operation member 67c of the lock member 67 comes in contact with the action tab 72a of the ratchet member 72, the lock member 67 is rotated in the counter-clockwise direction relatively to the cartridge holder 47 against the spring force of the torsion coil spring 69.

Specifically, when the operation member 67c of the lock member 67 contacts with the action tab 72a of the ratchet member 72, the lock member 67 remains stationary while the cartridge holder 47 is rotated in the upper direction. Thus, the lock pin 64 is disengaged from the tab portion 67a of the lock member 67 and the lock member 67 is released from the locked state, whereby the eject lever 58 is moved in the forward direction and returned to the original position under spring force of the tension coil spring 61. As a result, the disc cartridge 101 is ejected from the cartridge holder 47 by the eject lever 58.

When the cartridge holder 47 is elevated up to the uppermost rotational position after the upper lid 12 has been opened completely, the operation member 67c of the lock member 67 passes the action tab 72a of the ratchet member 72 so that the lock member 67 is returned to the original state.

The disc cartridge 101 is ejected from the cartridge holder 47 at the same time when the upper lid 12 is opened as described above. Therefore, the user can eject the disc cartridge 101 from the cartridge holder 47 with ease.

While an exemplary disc player has been described as the electronic equipment so far, the present invention is not limited thereto and may be applied to other types of small electronic equipment, such as a cassette tape recorder or the like.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An electronic apparatus comprising:

a drive mechanism portion;

a chassis formed of sheet metal bent into a frame of substantially square shape, the chassis supporting the drive mechanism portion thereon, with the chassis having a side surface, and with the chassis defining an upper surface side and a lower surface side; and a battery compartment portion made of a rigid material, the battery compartment portion being attached to the chassis in alignment with the side surface of the chassis.

2. An electronic apparatus according to claim 1, wherein the battery compartment portion is made by zinc die casting.

3. An electronic apparatus according to claim 1, further comprising:

a panel frame having a plurality of operation buttons attached to the outside of the chassis;

an upper lid made of a metal material attached to the upper surface side of the chassis so that the upper lid becomes freely rotatable relative to the chassis so as to cover the drive mechanism portion; and a lower lid made of a metal material attached to the chassis so as to close the lower surface side of the chassis.

4. An electronic apparatus according to claim 3, wherein the panel frame is made of a synthetic resin material.

5. The electronic apparatus according to claim 1, further comprising:
   an upper lid, made of a metal material, attached to the chassis which closes the upper surface side of the chassis;
   a lower lid, made of a metal material, attached to the chassis, which closes the lower surface side of the chassis,
   a panel frame attached to the chassis, having a concave portion, a first aperture and a two second aperture defined therein, with the first and second apertures being defined within the concave portion;
   a base plate having a switch, the base plate disposed between the panel frame and the chassis; and
   a plate spring;
   an operation button, having a first protrusion and a second protrusion, respectively engaged in the concave portion of the panel frame so that the first protrusion passes through the first aperture to the switch of the base plate on and off, and the second protrusion passes through the second aperture and is fixed to the plate spring.

6. The electronic apparatus according to claim 1, wherein the battery compartment is attached to the chassis so that it is outside of the frame of the chassis.

7. An electronic apparatus comprising:
   a drive mechanism portion;
   a chassis formed of sheet metal bent into a frame of substantially square shape, the chassis supporting the drive mechanism portion thereon, with the chassis having a side surface, and with the chassis defining an upper surface side and a lower surface side;
   a battery compartment portion made of a rigid material, the battery compartment portion being attached to the chassis in alignment with the side surface of the chassis;
   a panel frame having a plurality of operation buttons attached to the outside of the chassis;
   an upper lid made of a metal material attached to the upper surface side of the chassis so that the upper lid becomes freely rotatable relative to the chassis so as to cover the drive mechanism portion;
   a lower lid made of a metal material attached to the chassis so as to close the lower surface side of the chassis; and
   a battery lid for opening and closing the battery compartment portion;
   wherein the chassis includes a first bearing portion by which the battery lid is pivotally supported and a second bearing portion provided near the first bearing portion for pivotally supporting the upper lid; and
   wherein the battery lid and the upper lid are attached to the chassis by the first and second bearing portions so as to be openable and closable in different directions from each other.

8. An electronic apparatus according to claim 7, wherein the first bearing portion is composed of a pair of bearing portions opposed to each other with a predetermined spacing therebetween and the second bearing portion is disposed between the pair of bearing portions in a direction perpendicular to the direction of the first bearing portion.

9. An electronic apparatus comprising:
   a drive mechanism:
   a chassis formed of a band-shaped piece of sheet metal bent into a frame of substantially square shape, with the chassis including a first side wall and a second side wall, and with the chassis defining an upper surface, a lower surface and a first thickness measured between the upper surface and the lower surface;
   a damping mechanism for supporting the drive mechanism on the chassis;
   an upper lid attached to the upper surface side of the chassis so as to open and close the upper surface of the chassis, the upper lid being made of a metal material;
   a lower lid attached to the chassis so as to close the lower surface of the chassis, the lower lid being made of a metal material;
   a substantially U-shaped panel frame made of a synthetic resin, having a plurality of operation buttons, disposed on the outside of the chassis; and
   a battery compartment portion made of a metal material attached to the first side wall of the chassis, the battery compartment portion having a second thickness which is substantially the same as the first thickness.

10. An electronic apparatus according to claim 9, further comprising:
    a battery lid for opening and closing the battery compartment portion, the battery lid being attached to the chassis;
    wherein the upper lid opens and closes by rotation around a first axis; and
    wherein the battery lid opens and closes by rotation around a second axis, with the second axis which is perpendicular to the first axis.

11. An electronic apparatus according to claim 9, further comprising:
    a base plate having a plurality of switches operable by the operation buttons; and
    a plate-shaped spring member to which the operation buttons are attached;
    wherein the base plate and the plate-shaped spring member are attached to the chassis on the second side wall which opposes the first side wall.

12. An electronic apparatus according to claim 9, further comprising:
    a circuit board attached at the lower surface of the chassis between a lower surface side of the chassis and the lower lid.

* * * * *